Patented Oct. 25, 1932

1,884,796

UNITED STATES PATENT OFFICE

GEORGE P. MEADE, OF GRAMERCY, LOUISIANA, AND RALPH N. TRAXLER, OF RAHWAY, NEW JERSEY

METHOD OF PRODUCING SOLUBLE BARYTIC MATERIAL FOR USE AS A SUGAR PRECIPITANT

No Drawing. Application filed November 23, 1929. Serial No. 409,421.

This invention relates to a method of producing soluble barytic material for use as a sugar precipitant.

The method consists in calcining together silicious material and barium in the proportion of more than three atoms of barium to each atom of silicon, at least a part of the barium being present as a barium-sulphur-oxygen compound, such as barium sulphite $BaSO_3$, and in decomposing the resulting compound, which contains barium, silicon and sulphur, by water into insoluble barium silicate and soluble barytic material containing more than two atoms of barium for each atom of silicon used in the process.

A specific example of the method consists in mixing and introducing into a suitable kiln, barium sulphite, $BaSO_3$, and silica in the proportion of three and one-third molecules of the sulphite to one molecule of the silica. The mixed material is heated to approximately 1320° C. The calcining should be conducted under slightly reducing conditions. This results in forming a clinker whose chemical structure cannot be exactly stated, but which on analysis is found to contain:

| | Per cent |
|---|---|
| Barium | 79.42 |
| Sulphur | 1.85 |
| Silicon | 4.86 |
| Oxygen | 13.87 |
| | 100.00 |

The clinker, which is easily friable, is decomposed by grinding it with water in a ball mill. This results in forming insoluble barium silicate containing one atom of barium for each atom of silicon present. The remaining two and one-third atoms of barium for each atom of silicon used are contained in soluble barytic material which is dissolved in the water. This soluble barytic material, which is found to consist of eighty-four and one-half per cent of barium oxide, BaO, and fifteen and one-half per cent of barium sulphide, BaS, may be used to advantage as a sugar precipitant.

Another specific example of the method consists in calcining together barium sulphite, $BaSO_3$, and barium silicate, $BaOSiO_2$, in the proportion of two and one-third molecules of the sulphite to one molecule of the silicate. The clinker produced in this method is substantially the same as that produced in the first example, and is similarly decomposed with water. By the use of this method, the barium silicate produced by the decomposition of the clinker may be re-used.

During the calcining, sulphur passes off in the flue gases from the kiln in the form of sulphur dioxide. The flue gases consist principally of steam and of carbon dioxide gas from the fuel burnt in the kiln. A feature of our process consists in extracting the sulphur dioxide from the flue gases in order that it may be used to recover, in the form of barium sulphite, the barium of the soluble barytic material which has been used as a sugar precipitant. The extraction of the sulphur dioxide is accomplished by chilling the flue gases below the boiling point of water, so as to condense the steam which they contain. The water thus formed contains the sulphur dioxide dissolved in the form of sulphurous acid, while the carbon dioxide passes off in gaseous form. The water containing the dissolved sulphurous acid is then boiled to expel the sulphur dioxide which is trapped and compressed for use in barium recovery.

The atomic proportion of the barium to the silicon in calcining may be increased above three and one-third to one with a corresponding increase in the yield of soluble barytic material. The proportion of barium sulphide in the soluble barytic material is also increased. Thus, if the barium-silicon atomic ratio is increased to three and one-half to one, the soluble barytic material contains approximately twenty-one per cent of barium sulphide. We have found, however, that if soluble barytic material contains more than twenty per cent of its barium in the form of barium sulphide, the excess of barium sulphide beyond this limit is comparatively ineffective in sugar precipitation. Consequently, when the soluble barytic material is to be used as a sugar precipitant, no advantage is gained by using a proportion of barium in excess of three and one-half times the silicon, but the increase of this proportion with the consequent increase in the amount of soluble barytic material may be useful for other purposes and is within the scope of our invention.

What is claimed is:

1. A method of making soluble barytic material, which consists in calcining together insoluble barytic material and silicious material in the proportion of more than three atoms of barium to one atom of silicon, at least a part of the barium being in the form of a barium-sulphur-oxygen compound, and decomposing the resulting clinker with water with the production of insoluble barium silicate and soluble barytic material containing more than two atoms of barium for each atom of silicon used and containing sulphur.

2. A method of making soluble barytic material, which consists in calcining together insoluble barytic material and silicious material in the proportion of more than three atoms of barium to one atom of silicon, at least a part of the barium being in the form of barium sulphite, and decomposing the resulting clinker with water with the production of insoluble barium silicate and soluble barytic material containing more than two atoms of barium for each atom of silicon used.

3. A method of making soluble barytic material, which consists in calcining together insoluble barytic material and silicious material in the proportion of from three and one-third to three and one-half atoms of barium to one atom of silicon, at least a part of the barium being in the form of a barium-sulphur-oxygen compound, and decomposing the resulting clinker with water with the production of insoluble barium silicate and soluble barytic material containing from two and one-third to two and one-half atoms of barium for each atom of silicon used and containing sulphur.

4. A method of making soluble barytic material, which consists in calcining together insoluble barytic material and silicious material in the proportion of three and one-third atoms of barium to one atom of silicon, at least a part of the barium being in the form of barium sulphite, and decomposing the resulting clinker with water with the production of insoluble barium silicate and soluble barytic material containing two and one-third atoms of barium for each atom of silicon used.

5. A method of making soluble barytic material, which consists in calcining a barium-sulphur-oxygen compound with barium silicate in the proportion of more than two molecules of the former to one molecule of the latter, and in decomposing the resulting clinker with water to form barium silicate and water-soluble barytic material containing more than two atoms of barium for each atom of silicon used in the process and containing sulphur.

6. A method of making soluble barytic material, which consists in calcining barium sulphite with barium silicate in the proportion of more than two molecules of the former to one molecule of the latter, and in decomposing the resulting clinker with water to form barium silicate and water-soluble barytic material containing more than two atoms of barium for each atom of silicon used in the process.

7. A method of making soluble barytic material, which consists in calcining a barium-sulphur-oxygen compound with barium silicate in the proportion of from two and one-third to two and one-half molecules of the former to one molecule of the latter, and in decomposing the resulting clinker with water to form barium silicate and water-soluble barytic material containing from two and one-third to two and one-half atoms of barium for each atom of silicon used in the process and containing sulphur.

8. A method of making soluble barytic material, which consists in calcining barium sulphite with barium silicate in the proportion of two and one-third molecules of the former to one molecule of the latter, and in decomposing the resulting clinker with water to form barium silicate and water soluble barytic material containing two and one-third atoms of barium for each atom of silicon used in the process.

In testimony whereof we have hereunto set our hands.

GEORGE P. MEADE.
RALPH N. TRAXLER.